United States Patent
Alessi et al.

(10) Patent No.: US 11,831,793 B2
(45) Date of Patent: Nov. 28, 2023

(54) METHODS AND DEVICES FOR AUTHENTICATION

(71) Applicants: STMICROELECTRONICS DESIGN AND APPLICATION S.R.O., Prague (CZ); STMicroelectronics S.r.l., Agrate Brianza (IT)

(72) Inventors: Enrico Rosario Alessi, Catania (IT); Mario Antonio Aleo, Catania (IT); Karel Blaha, Plzen (CZ); Pavel Vicek, Prague (CZ)

(73) Assignees: STMicroelectronics S.r.l., Agrate Brianza (IT); STMICROELECTRONICS S.R.O., Prague (CZ)

( * ) Notice: Subject to any disclaimer, the term of this patent is extended or adjusted under 35 U.S.C. 154(b) by 488 days.

(21) Appl. No.: 17/107,532

(22) Filed: Nov. 30, 2020

(65) Prior Publication Data
US 2022/0173918 A1    Jun. 2, 2022

(51) Int. Cl.
*H04L 9/32* (2006.01)
*H02J 50/80* (2016.01)
*H04W 12/71* (2021.01)

(52) U.S. Cl.
CPC ............ *H04L 9/3278* (2013.01); *H02J 50/80* (2016.02); *H04W 12/71* (2021.01); *H04L 2209/805* (2013.01)

(58) Field of Classification Search
CPC . H04L 9/3273; H04L 9/3278; H04L 2209/80; H04L 2209/805; H04W 12/06; H04W 12/60; H04W 12/63; H04W 12/65; H04W 12/71; H02J 50/10; H02J 50/80; H02J 50/90; H02J 7/00045; H02J 7/02
See application file for complete search history.

(56) References Cited

U.S. PATENT DOCUMENTS

| | | |
|---|---|---|
| 8,804,954 B2 | 8/2014 | Garnier et al. |
| 2009/0161919 A1 | 6/2009 | Vogler et al. |
| 2020/0279269 A1 | 9/2020 | Wagner et al. |
| 2022/0116776 A1* | 4/2022 | Spangler .............. H02J 50/80 |
| 2022/0337099 A1* | 10/2022 | Jung ................... H02J 50/90 |

FOREIGN PATENT DOCUMENTS

CN    106602654 A    4/2017

OTHER PUBLICATIONS

Gao et al., "Lightweight (Reverse) Fuzzy Extractor With Multiple Referenced RUF Responses," Nov. 19, 2018, 14 pages.

* cited by examiner

*Primary Examiner* — Minh Dinh
(74) *Attorney, Agent, or Firm* — Slater Matsil, LLP (57) ABSTRACT

A method for mutual authentication that includes establishing a first inductive coupling between a wireless-power receiver and a wireless-power transmitter to transfer power from the wireless-power transmitter to the wireless-power receiver by a power signal and using the power signal to transmit a first response to a physically unclonable function to the wireless-power transmitter. The method further including generating a second response to the physically unclonable function and communicating information derived from the second response to initiate a mutual authentication process between the wireless-power receiver and the wireless-power transmitter during a subsequent inductive coupling.

22 Claims, 6 Drawing Sheets

```
┌─────────────────────────────────────────────────────────────────────┐
│ Establish a first inductive coupling between a wireless-power       │
│ receiver and a wireless-power transmitter to transfer power from    │
│ the wireless-power transmitter to the wireless-power receiver by a  │
│ power signal                                                        │
│                              602                                    │
└─────────────────────────────────────────────────────────────────────┘
                                  │
                                  ▼
┌─────────────────────────────────────────────────────────────────────┐
│ Use the power signal to transmit a first response to a physically   │
│ unclonable function from the wireless-power receiver to the         │
│ wireless-power transmitter                                          │
│                              604                                    │
└─────────────────────────────────────────────────────────────────────┘
                                  │
                                  ▼
┌─────────────────────────────────────────────────────────────────────┐
│ Store the first response in the wireless-power transmitter          │
│                              606                                    │
└─────────────────────────────────────────────────────────────────────┘
                                  │
                                  ▼
┌─────────────────────────────────────────────────────────────────────┐
│ Generate, by the wireless-power receiver, a second response to the  │
│ physically unclonable function by the wireless-power receiver       │
│                              608                                    │
└─────────────────────────────────────────────────────────────────────┘
                                  │
                                  ▼
┌─────────────────────────────────────────────────────────────────────┐
│ Communicate information derived from the second response to         │
│ initiate a mutual authentication process between the wireless-power │
│ receiver and the wireless-power transmitter during a subsequent     │
│ inductive coupling.                                                 │
│                              610                                    │
└─────────────────────────────────────────────────────────────────────┘
```

FIG. 6

METHODS AND DEVICES FOR AUTHENTICATION

TECHNICAL FIELD

The present invention relates to methods and devices for authentication.

BACKGROUND

Wireless charging systems provide convenient means to recharge mobile devices. As a result, they have become incorporated in a variety of different types of systems and are found in many locations. Security concerns may incentivize authentication safeguards for wireless-power devices.

SUMMARY

In accordance with an embodiment, a method for mutual authentication includes establishing a first inductive coupling between a wireless-power receiver and a wireless-power transmitter to transfer power from the wireless-power transmitter to the wireless-power receiver by a power signal; using the power signal to transmit a first response to a physically unclonable function from the wireless-power receiver to the wireless-power transmitter; storing the first response in the wireless-power transmitter; generating, by the wireless-power receiver, a second response to the physically unclonable function by the wireless-power receiver; and communicating information derived from the second response to initiate a mutual authentication process between the wireless-power receiver and the wireless-power transmitter during a subsequent inductive coupling.

In accordance with an embodiment, a wireless-power receiver includes an inductive coil configured to receiver a power signal from a wireless-power transmitter during couplings with the wireless-power transmitter wherein the power signal induces a charging current in an analog circuit coupled with the inductive coil; a microcontroller configured to modulate the power signal to communicate a first response to a physically unclonable function to the wireless-power transmitter during a first coupling between the wireless-power transmitter and the wireless-power receiver; and wherein the microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

In accordance with an embodiment, a system for wireless-power transfer includes a wireless-power transmitter that includes a transmitter inductive coil configured to produce a power signal; a transmitter microcontroller in communication with a transmitter analog circuit coupled with the transmitter inductive coil, the transmitter microcontroller being configured to modulate the power signal for communication; and a memory in communication with the transmitter microcontroller. The system further including a wireless-power receiver that includes a receiver inductive coil configured to receive the power signal from the wireless-power transmitter during couplings with the wireless-power transmitter wherein the power signal induces a charging current in an analog circuit coupled with the receiver inductive coil; and a receiver microcontroller configured to modulate the power signal to communicate a first response to a physically unclonable function to the wireless-power transmitter during a first coupling between the wireless-power transmitter and the wireless-power receiver; and wherein the receiver microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. Unless denoted otherwise, elements that are referenced with the same reference number may refer to the same element.

Figure 1:
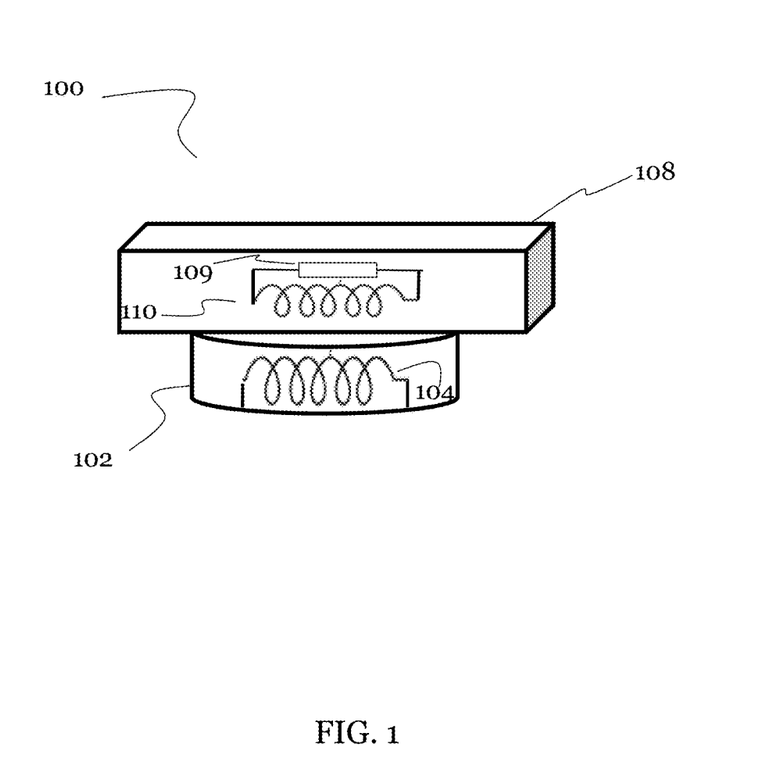
FIG. 1 depicts a system for wirelessly charging a device.

FIG. 1 depicts a system 100 for wirelessly charging a device.

As shown in FIG. 1, the system 100 may comprise a wireless-power transmitter 102 and a wireless-power receiver 108. The wireless-power transmitter 102 may comprise an inductive coil 104. And, the wireless-power receiver may comprise an inductive coil 110.

The wireless-power transmitter 102 may comprise a battery in various embodiments, that may serve as a power supply for the wireless power transfer from the wireless-power transmitter 102 to the wireless-power receiver 108. In various embodiments, the wireless-power transmitter may be coupled with a variety of power sources. For example, the wireless-power transmitter 102 may be configured to be coupled with a power source by a plug 106. In various embodiments, the plug 106 may be configured to be fitted with a wall socket.

In various embodiments, the wireless-power transmitter 102 may be embedded in another system or device. For example, the wireless-power transmitter 102 may be located in an automobile. The wireless-power transmitter 102 may have access to an automobile's power source. In various embodiments, the wireless-power transmitter 102 may also be in communication with the automobile's network. In various embodiments, the wireless-power transmitter 102 may be in a located in a home, business, or other environment and be coupled to any variety of different networks.

In various embodiments, the power source for the wireless-power transmitter 102 may generate an alternating current in the wireless-power transmitter 102 through the inductive coil 104. This may create an oscillating magnetic field. The oscillating magnetic field may induce a current in an circuit that is coupled with a inductive coil no of the wireless-power receiver 108. The current induced in the wireless-power receiver 108 by the oscillating magnetic field, in various embodiments, may then be utilized for charging a battery 109 of the wireless-power receiver 108.

Current received by the wireless-power receiver 108 may comprise an alternating current. In various embodiments, it may be advantageous to convert alternating current received by the wireless-power receiver 108 into a direct current. This may be advantageous because many electronic components are compatible with direct current. A voltage regulator may also be utilized to reduce the voltage level of the power supplied to a level compatible with components of the wireless-power receiver 108.

Communication between the wireless-power transmitter 102 and the wireless-power receiver 108 may be helpful to establish a coupling and regulate the power transfer. For example, in various embodiments, the wireless-power receiver 108 may communicate with the wireless-power transmitter 102 to ask the wireless-power transmitter 102 to deliver more or less power.

The wireless-power transmitter 102 may respond by varying the magnetic field to deliver more or less power. In various embodiments, communication between the wireless-power transmitter 102 and the wireless-power receiver 108 may be accomplished by modulating the power signal transmitting power from the wireless-power transmitter 102 to the wireless-power receiver.

The Wireless Power Consortium (WPC) provides the Qi standard for wireless power transfers. The Qi standard is used for many wireless charging systems. The Qi standard provides guidelines for communication between wireless-power transmitter 102 and wireless-power receivers 108. According to the Qi standard Amplitude Shift Keying may be utilized for communication from the wireless-power receiver 108 and the wireless-power transmitter 102. And, also according to the Qi standard, Frequency Shift Keying may be utilized for communications from the wireless-power transmitter 102 to the wireless-power receiver 108. Thus, the power signal transferring power from the wireless-power transmitter 102 to the wireless-power receiver 108 may also be used as a medium for communication between the wireless-power transmitter 102 and the wireless-power receiver 108. However, it should be noted that embodiments of this disclosure are not limited to devices that conform with all Qi standards.

Amplitude Shift Keying is a form of signal modulation where the variations in the amplitude of a signal are used to transmit data. In various embodiments, the wireless-power receiver 108 may generate an ASK signal by varying the load of a receiving circuit.

It may be desirable to employ an authentication process when conducting a wireless power transfer between a wireless-power transmitter 102 and a wireless-power receiver 108. This may be advantageous to prevent security breeches, or prevent unwanted devices from accessing power from a wireless-power transmitter 102. Authentication may also be a prerequisite for access to advanced functions potentially available when a wireless-power receiver (for example a mobile phone) connects with resources available on a network coupled with a wireless-power transmitter (for example, in a vehicle). In this way, in various embodiments, authentication may be utilized a gatekeeper for vehicle-to-device secure data exchanges for implementing functions like: vehicle cockpit personalization; infotainment; and payment for services. In various embodiments, authentication may be required before a wireless-power receiver may access the advanced functioning features of a system connected to the wireless-power transmitter 102.

In various embodiments, it may be advantageous to utilize the power signal transferring power from a wireless-power transmitter 102 to a wireless-power receiver 108 for authentication. This may be beneficial because it can provide a communication channel without a need for additional hardware and that may be isolated from the rest of a system.

Figure 2:
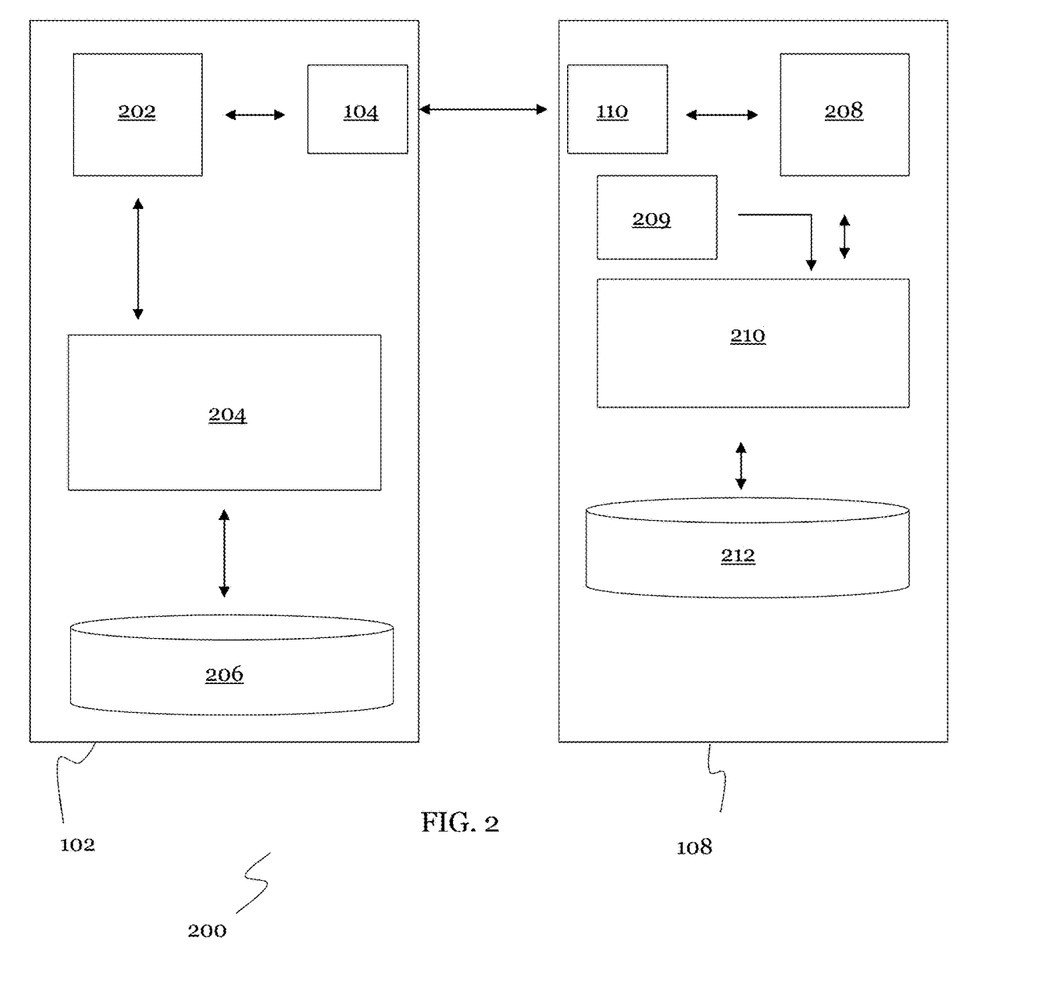
FIG. 2 depicts a system for wireless charging and authentication in accordance with an embodiment.

FIG. 2 depicts a system 200 for wireless charging and authentication.

In various embodiments, the system 200 may comprise a wireless-power transmitter 102. In various embodiments, the wireless-power transmitter 102 may comprise an inductive coil 104. The inductive coil 104 may generate a power signal by means of generating an oscillating magnetic field. The wireless-power transmitter 102 may comprise a circuit 202 that is coupled with the inductive coil 104.

The wireless-power transmitter 102 may further comprise a microcontroller 204 in communication with the circuit 202. And, the microcontroller 204 may be configured to modulate the power signal. This may allow the wireless-power transmitter 102 to communicate with the wireless-power receiver 108 using the power signal. In various embodiments, the microcontroller 204 may modulate the power signal according to a frequency shift keying modulation scheme.

In various embodiments, the microcontroller 204 may be configured to demodulate a signal received from a wireless-power receiver 108 through the power signal. For example, the microcontroller may be configured to demodulate ASK communication encoded on the power signal by a wireless-power receiver inductively coupled with the wireless-power transmitter 102. The wireless-power transmitter 102 may comprise hardware to demodulate communications on a power signal during an inductive coupling with a wireless-power receiver 108.

In various embodiments, the wireless-power transmitter 102 may comprise a memory 206 in communication with the microcontroller 204. In various embodiments, the microcontroller 204 may comprise the memory 206. The microcontroller may 204 be configured to retrieve data from the memory 206 or store data on the memory 206.

The system 200 may further comprise a wireless-power receiver 108. The wireless-power receiver 108 comprise an inductive coil 110 configured to receive a power signal from the wireless-power transmitter 102 during couplings with the wireless-power transmitter 102. The power signal may induces a charging current in a circuit 208 coupled with the inductive coil 110. This charging current may be used to charge a battery 109 of the wireless-power receiver 108.

The wireless-power receiver 108, in various embodiments, may further comprise a microcontroller 210. The microcontroller 210 may be configured to modulate the power signal. In various embodiments, this may be accomplished by varying the load on the circuit 208. For example, in various embodiments, this may be accomplished by varying the frequency response of the circuit 208 by adding or removing capacitors to the circuit 208.

As will be appreciated. The load may be varied in different ways in different embodiments. The microcontroller 210 may deliver control signals to components (like switches) of the circuit 208 to vary the load. The load may be varied to encode the power signal with an amplitude shift keyed communication that may be detected by the wireless-power transmitter 102 during couplings between the wireless-power transmitter 102 and the wireless-power receiver 108.

In various embodiments, the wireless-power receiver 108 may also be configured to demodulate a signal transmitted by the wireless-power transmitter 102 using the power signal. In various embodiments, the wireless-power receiver 108 may comprise hardware to demodulate a power signal.

In various embodiments, the wireless-power receiver 108 may comprise a physically unclonable function ("PUF") 209. In various embodiments, a PUF 209 may serve as digital fingerprint of a device that may be used to identify the device, but that is difficult to discover or replicate by an imposter.

In various embodiments, a PUF 209 may comprise a physical feature that may be measured to represent unique variations in a physical structure in digital form. A wide variety of PUFs are known in the art including, but not limited to, SRAM PUFs, DRAM PUFs, resistance PUFs. In various embodiments, the PUF 209 may comprise any PUF known in the art. In various embodiments, a response to a PUF 209 may be generated from measurement of the circuit 208 such as current, resistance, load impedance or other parameters during the coupling among the Power Transmitter and the Power Receiver. It may be advantageous to utilize a response from a PUF 209 during coupling to generate a key on the fly without having to store data that may accessed.

In various embodiments, a microcontroller 210 may be in communication with the PUF 209 to measure a response of the PUF 209. As will be appreciated, the response of the PUF 209 may vary each time that it is measured. Depending on the type of PUF 209, this may be the result of variations in temperature, ageing, or other factors. A response to the PUF 209, or information derived from the PUF 209 may be communicated between the wireless-power transmitter 102 and the wireless-power transmitter 108 as a means to authenticate the identity of the wireless-power transmitter 102 and the wireless-power receiver 108.

In various embodiments, information may be exchanged during an initial coupling between a wireless-power transmitter 102 and a wireless-power receiver 108 that may be utilized for mutual authentication during subsequent couplings. In some embodiments, an initial coupling may be initiated by another form of security protection to ensure that initial coupling is secure. For example, in various embodiments, an initial coupling may prompt a user to enter a pin number or other verifying information before allowing exchange of sensitive data. Afterwards, a PUF 209 response, or information derived from a PUF 209 response may be communicated from the wireless-power receiver 108 to the wireless-power transmitter 102 and stored in the memory 206 of the wireless-power receiver for future authentication.

In various embodiments, the microcontroller 210 of the wireless-power receiver 108 may communicate a first response to a PUF 209 to the wireless-power transmitter 102 during an initial coupling. In various embodiments, this may be communicated by using the power signal. Once received by the wireless-power transmitter 102 it may be stored in the memory 206.

In various embodiments, the wireless-power receiver 108 may also transmit another identifier to the wireless-power transmitter 102, for example a Wireless Power Identification Number ("WPID"). The wireless-power transmitter 102 may store the unique identifier along with the first response to the PUF 209 so that the first response to the PUF 209 may be retrieved the next time the wireless-power receiver 108 couples with the wireless-power transmitter 102.

During subsequent couplings, the microcontroller 210 may generate (by, measurement, for example) a second a response to the PUF 209. The second response to the PUF 209, or information derived from the second response to the PUF 209 may be communicated to the wireless-power transmitter 102 for mutual authentication of the wireless-power transmitter 102 and the wireless-power receiver 108. A unique identifier, like the WPID, may also be communicated to the wireless-power transmitter 102 to allow the wireless-power transmitter 102 to retrieve the first response associated with the wireless-power receiver 108.

In various embodiments, various authentication processes using responses to a PUF 209 may be utilized. Various embodiments may utilize responses to a PUF 209 as part of a challenge response between the wireless-power transmitter 102 and the wireless-power receiver 108.

In various embodiments, it may be advantageous to attempt to compensate for variations among a response to a PUF 209. This may be beneficial because a response to a PUF 209 may be utilized for authentication purposes and variations in responses to a PUF 209 may prevent a wireless-power receiver 108 from being authenticated. Differences in conditions, such as temperature or distance between a wireless-power transmitter 102 and a wireless-power receiver 108, may cause variations in responses to a PUF 209. This may be referred to as a bit flip because some bit values of a response to a PUF 209 may be flipped in subsequent responses to the PUF 209. Other factors may also produce bit flips. For example, ageing may impact the response to a PUF 209.

Figure 3:
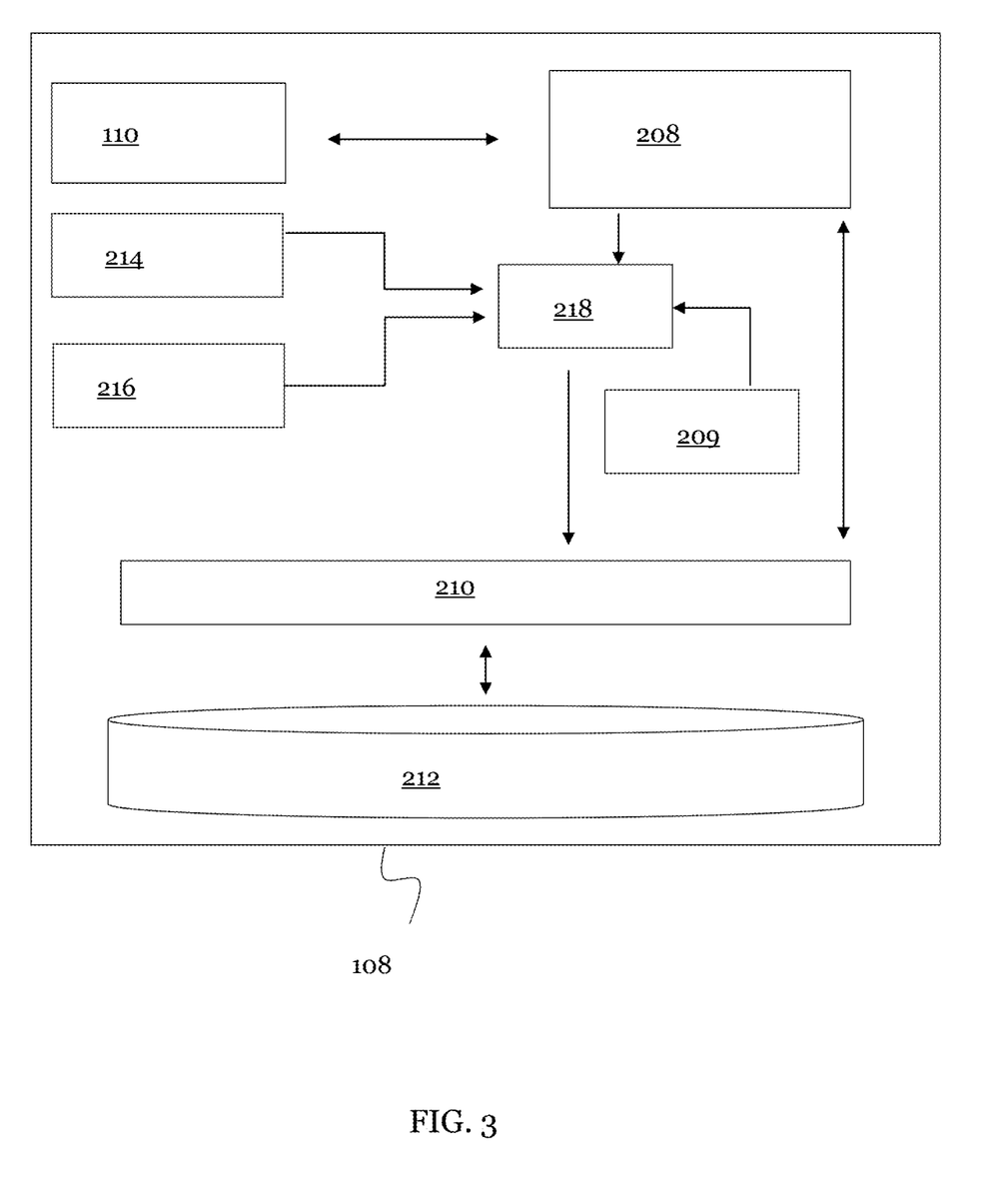
FIG. 3 depicts an embodiment of a wireless-power receiver in accordance with an embodiment.

FIG. 3 depicts an embodiment of a wireless-power receiver 108.

The wireless-power receiver 108 may comprise one or more sensors to measure various parameters. The microcontroller 210 may be in communication with the sensors and be configured to adjust the response to a PUF 209 depending on the measurements taken by the sensors. This may reduce bit flips and allow a PUF 209 to be more consistent. This may reduce errors in an authentication process. The microcontroller 210 may be configured to execute a program stored in a non-transitory memory to adjust the response to the PUF in response to the measurements taken. The wireless-power receiver 108 may comprise sensors to detect the PUF response that are in communication with the microcontroller 210.

In various embodiments, the wireless-power receiver 108 may comprise a temperature sensor 214. The wireless-power receiver 108 may also comprise an analog front end 218 to interface between the microcontroller 210 and sensors of the wireless-power receiver 108. In various embodiments, the wireless-power receiver 108 may also comprise a analog to digital converter (not depicted in FIG. 3). In various embodiments, the microcontroller 210 may comprise the analog to digital converter. In various embodiments, an analog to digital converter may be located between an output of the analog front end 218 and the microcontroller 210. In various embodiments, the PUF 209 may be coupled with the analog front end 218.

The temperature sensor 214 may be coupled with the analog front end 218. In various embodiments, the microcontroller 210 may adjust the response to a PUF 209 based on the temperature sensed by the temperature sensor 214. Adjustments to a response to the PUF 209 may comprise employing a correction curve that is based on how features of the PUF 209 respond to temperature changes. Correction curves may be generated based on measurements of the wireless-power receiver 108 at various temperatures. In various embodiments, a correction curve for a class of similar PUFs maybe generated based on the measurements of a characteristic PUF. A correction curve for a given class of PUFs may be used for responses to any PUF of that class.

In various embodiments, the wireless-power receiver 108 may comprise a locational sensor 216 in communication with the microcontroller 210. The locational sensor 216 may be configured to measure a distance between the wireless-power transmitter 102 and the wireless-power receiver 108. The locational sensor 216 may be coupled with the analog front end 218. In various embodiments, the microcontroller 219 may adjust the response to a PUF 209 based on the distance between the wireless-power receiver 108 and the wireless-power transmitter 102. Adjustments may also be based on correction curves generated based on measurements taken from the PUF 209 during couplings at various distances or measurements of a characteristic PUF.

In various embodiments, it may be advantageous to transmit data derived from a response to a PUF 209 from a wireless-power receiver 108 to a wireless-power transmitter 102. This may be desirable to prevent interception of the PUF 209 response to maintain security of the wireless-power transmitter 102 and the wireless-power receiver 108. In various embodiments, a system 200 may comprises a fuzzy extractor process, or a reverse fuzzy extractor process to authenticate the wireless-power transmitter 102 and the wireless-power receiver 108. Details of a fuzzy extractor process may be found in *Lightweight (Reverse) Fuzzy Extractor with Multiple Referenced PUF Responses*, which is incorporated by reference herein. Y. Gao, Y. Su, L. Xu and D. C. Ranasinghe, in *IEEE Transactions on Information Forensics and Security*, vol. 14, no. 7, pp. 1887-1901, July 2019.

Figure 4A:
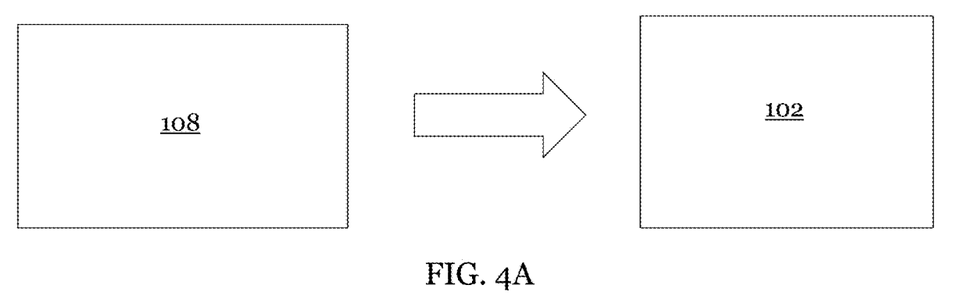
FIG. 4A depicts an initial coupling for a reverse fuzzy extractor authentication in accordance with an embodiment.

FIG. 4A depicts an initial coupling for a reverse fuzzy extractor authentication.

During an initial coupling between a wireless-power transmitter 102 and a wireless-power receiver 108, the wireless-power receiver 108 may generate a first response to the PUF 209. This may be transmitted to wireless-power transmitter 102, in various embodiments, along with a unique identifier (for example a WPID). The first response to the PUF 209 may then be stored in the memory 206 of the wireless-power transmitter 102 and associated with the WPID of the wireless-power receiver 108. An initial coupling may use an additional security mechanism like a PIN number to safeguard the transaction.

Figure 4B:
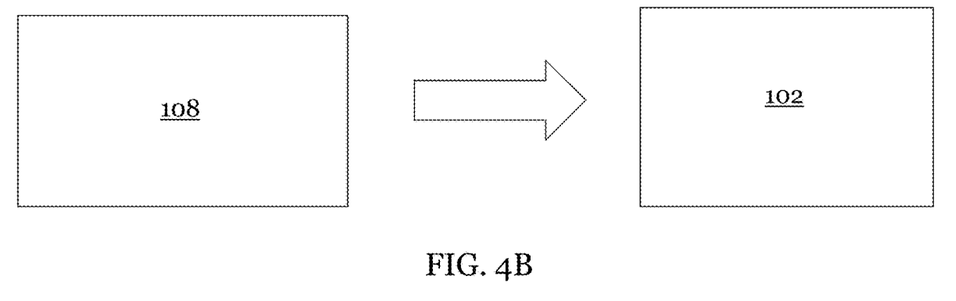
FIG. 4B depicts a first step of a reverse fuzzy extractor authentication during a subsequent coupling in accordance with an embodiment.

FIG. 4B depicts a first step of a reverse fuzzy extractor authentication during a subsequent coupling.

The wireless-power receiver 108 may generate a second response to the PUF 209 during a subsequent coupling between the wireless-power transmitter 102 and the wireless-power receiver 108. In various embodiments, the second response may be adjusted according to measurements of a sensor such as a temperature sensor 214 or a locational sensor 216. The second response to the PUF 209 may be used as an input to a Hash( ) function to produce a receiver secret key.

The second response to the PUF 209 may also be input to a Gen( ) function that produces helper data that will help enable the wireless-power transmitter 102 to reproduce a transmitter secret key modeled on the second response to the PUF 209 without transmission of the second response to the PUF 209 from the wireless-power receiver 108 to the wireless-power transmitter 102. The helper data may then be transmitted from the wireless-power receiver 108 to the wireless-power transmitter 102 using the power signal along with a unique identifier (for example, WPID) and a receiver nonce generated by a random function. In various embodiments, neither the second response to the PUF 209 nor the receiver secret key are transmitted to the wireless-power transmitter 102 from the wireless-power receiver 108.

Figure 4C:
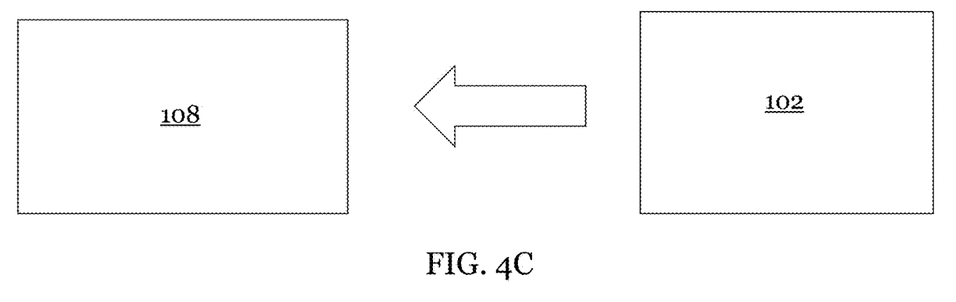
FIG. 4C depicts a second step of a reverse fuzzy extractor authentication during a subsequent coupling in accordance with an embodiment.

FIG. 4C depicts a second step of a reverse fuzzy extractor authentication during a subsequent coupling.

After the wireless-power transmitter 102 receives the unique identifier, the helper data, and the receiver nonce from the wireless-power receiver 108, the microcontroller 204 of the wireless-power transmitter 102 may retrieve the first response to the PUF 209 from the memory 206. The helper data and the first response to the PUF 209 may be used as inputs to a function Rep ( ) that attempts to generate a reproduced second response to the PUF 209 from the data provided. As can be appreciated, inconsistencies between the first response to the PUF 209 and the second response to the PUF 209 may compromise the ability of wireless-power transmitter to create a reproduced second response close enough to the second response to allow authentication because the first response is used as an input in the Rep ( ) function.

A transmitter secret key may also be reproduced, by the wireless-power transmitter, with a Hash( ) function using the reproduced second response that was generated by the Rep ( ) function. The unique identifier of the wireless-power receiver 108, the receiver nonce, a transmitter nonce (generated by a random function of the wireless-power transmitter 102), the helper data, and the transmitter secret key may all be input to a Hash( ) function and transmitted to the wireless-power receiver 108 using the power signal.

Figure 4D:
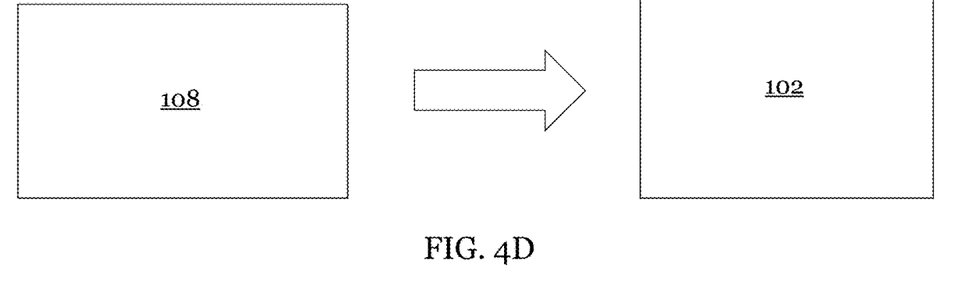
FIG. 4D depicts a third step of a reverse fuzzy extractor authentication during a subsequent coupling in accordance with an embodiment.

FIG. 4D depicts a third step of a reverse fuzzy extractor authentication during a subsequent coupling.

The wireless-power receiver 108 may receive the collection of the data transmitted by the wireless-power receiver in the previous step. The microcontroller 210 may analyze the data received from the wireless-power transmitter 102 to determine whether it matches the data generated by the wireless-power receiver 108 during the first step described with reference to FIG. 4A. If the data is not matched, then the wireless-power transmitter 102 may not be authenticated by the wireless-power receiver 108. If there is a match, then wireless-power transmitter 102 may be authenticated for the wireless-power receiver 108.

The unique identifier, the transmitter nonce, and the receiver secret key may then be input into a Hash( )function. This may then be transmitted from the wireless-power receiver 108 to the wireless-power transmitter 102. Having been authenticated by the wireless-power receiver 108, it may now be deemed secure to transfer the receiver secret key to the wireless-power transmitter 102. The wireless-power transmitter 102 may then input the transmitter nonce, the unique identifier and the transmitter secret key into a Hash 0 and compare the results with the data received from the wireless-power receiver. If there is a match, then the wireless-power transmitter 102 may authenticate the wireless-power receiver 108 completing mutual authentication.

In various embodiments, the transmissions from the wireless-power transmitter 102 to the wireless-power receiver 108 may be achieved using the power signal. This may be accomplished by Frequency Shift Keyed modulation of the power signal. In various embodiments, the transmissions from the wireless-power receiver 108 to the wireless-power transmitter 102 may also be achieved by using the power signal. And, in various embodiments, this may be accomplished by encoding a communication on the power signal with an Amplitude Shift Keyed encoding scheme.

In various embodiments, the initial response to a PUF 209 may comprise a multi-reference response to a PUF 209. This may provide multiple reference points and allow a system 200 to avoid errors during an authentication process.

To collect data for a multi-reference response to a PUF 209, the initial response to the PUF 209 may be collected under various conditions that may model conditions that may be encountered during operation. For example, in the context of temperature variations, a PUF 209 response may be collected at various reference points, each reference point being a measured a separate temperature. A first reference may be measured at a first temperature. A second reference may be measured at a second temperature. And, a third reference measured at a third temperature. And, all three references may be collectively referred to as a multi-reference response to the PUF 209. Then for authentication purposes, each reference of the multi-reference response to PUF 209 may be checked for authentication. Additional references may also be included. In various embodiments, a multi-reference response may include more than one type of variation. For example, a multi-reference response may comprise multiple temperature references and multiples positional references.

In various embodiments, a multi-reference response to a PUF 209 may be collected when a wireless-power receiver 108 is at multiple positions relative to a wireless-power transmitter 102. The positioning of wireless-power receiver 108 relative to a wireless-power transmitter 102 may create variations in PUF 209 measurements, for example, current, voltage, inductance, or load. By collecting multiple reference points, authentication errors may be reduced by allowing comparisons with multiple reference points for authentication.

Figure 5A:
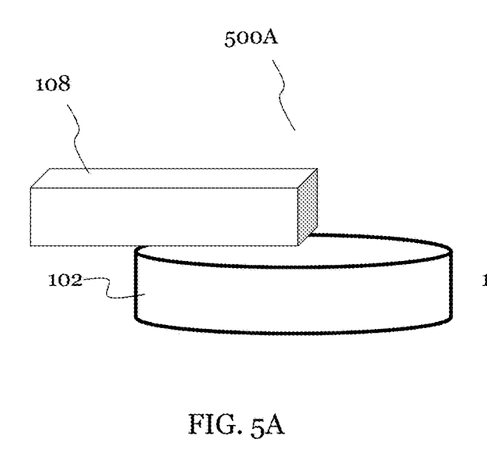
FIG. 5A depicts a first position of a wireless-power receiver relative to wireless power transmitter for collecting a multi-reference response in accordance with an embodiment.

FIG. 5A depicts a first position of a wireless-power receiver relative to wireless power transmitter for collecting a multi-reference response.

FIG. 5A depicts a first position 500A of a wireless-power receiver 108 relative to a wireless-power transmitter 102 during an initial coupling. As referenced at least in discussion of FIG. 4A, during an initial coupling between a wireless-power receiver 108 and a wireless-power transmitter 102 an initial (or first) response to a PUF 209 may be generated. It then may be transmitted to the wireless-power transmitter 102. The initial response may be collected while the wireless-power receiver 108 is at multiple positions relative to the wireless-power transmitter 102. Each position may correspond to a reference of a multi-reference response. FIG. 5A depicts an example of a first position 500A of the wireless-power receiver 108 relative to a wireless-power transmitter 102. The position of the wireless-power receiver 108 relative to the wireless-power transmitter 102 in FIG. 5A may correspond to a first reference of a multi-reference response.

Figure 5B:
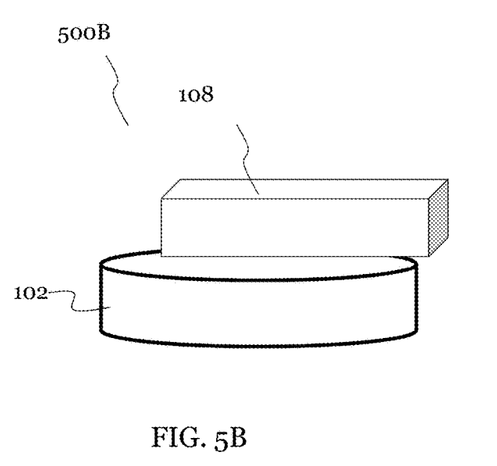
FIG. 5B depicts a second position of a wireless-power receiver relative to wireless power transmitter for collecting a multi-reference response.

FIG. 5B depicts a second position of a wireless-power receiver relative to wireless power transmitter for collecting a multi-reference response.

In FIG. 5B, the wireless-power receiver 108 and the wireless-power transmitter 102 are in a second position 500B. The second position 500B of the wireless-power receiver 108 relative to the wireless-power transmitter 102 in FIG. 5B may correspond to a second reference of a multi-reference response. Due to the change in position, the PUF 209 response generated when the wireless-power transmitter 102 and wireless-power receiver are in the first position 500A may be different than the response when the wireless-power transmitter 102 and the wireless-power receiver are in the second position 500B. During an initial coupling, the response to the PUF 209 may be produced when the wireless-power receiver and the wireless-power transmitter 102 are in the first position 500A and, again, when in the second position 500B. The response when in the first position 500A may be transmitted to the wireless-power transmitter 102 as the first reference of a multi-reference response to a PUF 209. The response when in the second position 500B may be transmitted to the wireless-power transmitter 102 as the second reference of a multi-reference response to a PUF 209. The transmission from the wireless-power receiver 108 to the wireless-power transmitter 102 may be accomplished by using the power signal.

Figure 5C:
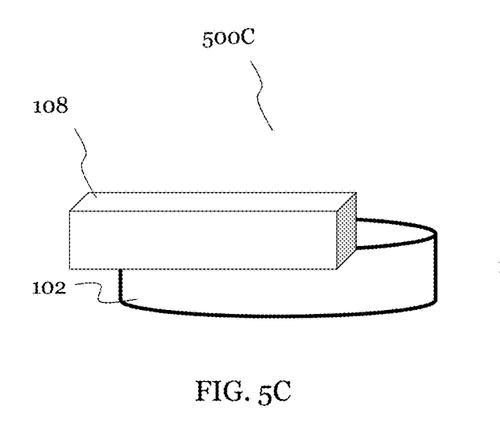
FIG. 5C depicts a third position of a wireless-power receiver relative to wireless power transmitter for collecting a multi-reference response.

FIG. 5C depicts a third position of a wireless-power receiver relative to wireless power transmitter for collecting a multi-reference response.

Additional references for a multi-reference response may be collected during additional positions. A third position 500C of the wireless-power receiver relative to the wireless-power transmitter 102 may correspond to a third reference of a multi-reference response to a PUF 209. Again, due to variations in the position, the third reference may vary from the first reference and the second reference. The third reference may be transmitted, along with any other references of a multi-reference response, to the wireless-power transmitter 102 from the wireless-power receiver 108.

Figure 5D:
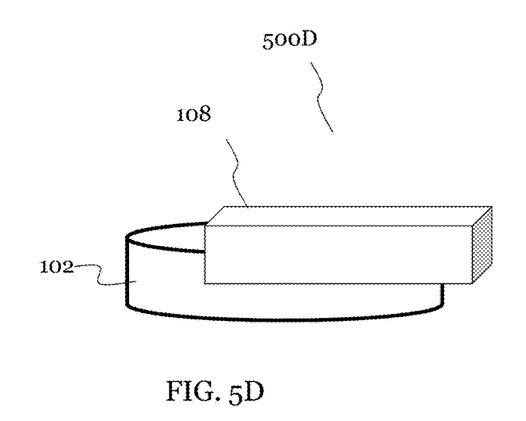
FIG. 5D depicts a fourth position of a wireless-power receiver relative to wireless power transmitter for collecting a multi-reference response.

FIG. 5D depicts a fourth position of a wireless-power receiver relative to wireless power transmitter for collecting a multi-reference response.

A fourth position 500D of the wireless-power receiver relative to the wireless-power transmitter 102 may correspond to a fourth reference of a multi-reference response to a PUF 209. Again, due to variations in the position, the fourth reference may vary from the first reference, the second reference, and the third reference. The fourth reference may be transmitted, along with any other references of a multi-reference response, to the wireless-power transmitter 102 from the wireless-power receiver 108. In various embodiment, a multi-reference response may comprise any number of references.

In various embodiments, a user may be prompted to shift the wireless-power receiver during an initial coupling to multiple positions so that multiple references may be collected. This may be accomplished, in various embodiments, by a user interface in communication with the microcontroller 210 of the wireless-power receiver.

Returning to FIG. 4D, in various embodiments, the wireless-power receiver may determine whether data received from the wireless-power transmitter 102 comprises a match by making a comparisons using each of the references of a multi-reference response to a PUF 209. For example, a first comparison may be made using the first reference. If there is a match, the wireless-power transmitter 102 may be authenticated. If not, a second comparison may be made using the second reference. If there is a match, the wireless-power transmitter 102 may be authenticated. If not, additional comparisons may be made using additional references until the wireless-power receiver 108 is authenticated, or the number of references is exhausted. If no match may be found, then the wireless-power receiver 108 may not be authenticated.

In various embodiments, ageing may also impact the accuracy of an authentication process. Ageing of the components of a PUF 209 may cause it to produce responses that change over time. To mitigate the impact of ageing, an initial response to a PUF 209 may be set to expire after a time period has passed. After expiration of an initial response, another initial response may be generated during a second initial coupling. For example, a device attempting an authentication with an expired initial response may be prompted to initiate a new initial coupling to create a new initial response. In various embodiments, the wireless-power receiver 108 may determine when an initial response has expired. In various embodiments, the wireless-power transmitter 102 may determine when an initial response has expired. Additionally, ageing curves may be used to compensate for variations when knowing how aging influence parameters of a PUF.

The microcontroller 210 of the wireless-power receiver 108 may be configured to perform steps of the authentication process by executing a program stored in a non-transitory memory. For example, during an initial coupling, the microcontroller 210 may execute a program to generate the initial response to the PUF 209 and communicate the initial response to the PUF 209 to the wireless-power transmitter. During a subsequent coupling, the microcontroller 210 of the wireless-power receiver may be configured to execute a program stored in non-transitory memory to generate a second response to a PUF 209, generate a receiver secret key by executing a Hash( ) function with the second response to the PUF 209 as an input, generate helper data by using a Gen( ) function with the second response to the PUF 209 as input date, and generate a receiver nonce by using a random number generator. The Hash ( ) function, Gen 0 function, and random number generator may all be programs that are stored in non-transitory memory of the wireless-power receiver 108 that may be called to execution by the microcontroller 210 when executing the steps of a program. The microcontroller 210 may also be configured to execute a program stored in non-transitory memory to communicate a unique identifier of the wireless-power receive 108, helper data, and the receiver nonce to the wireless-power transmitter 102.

The microcontroller 204 of the wireless-power transmitter 102, may be execute a program stored in non-transitory memory upon receiving the transmission of the wireless-power receiver 108 referenced in the previous paragraph to execute a Rep( ) function using the first response to the PUF 209 and the helper data to generate a reproduced second response to the PUF 209, generate a transmitter secret key using a Hash 0 function with the reproduced second response to the PUF 209 as an input, and generate a transmitter nonce using a random number generator. The microcontroller may further execute a program stored in non-transitory memory to input the unique identifier, the receiver nonce, the transmitter nonce, the helper data, and the transmitter secret key into a Hash 0 function and transmit the resulting data along with the transmitter nonce to the wireless-power receiver 108. The Hash ( ) function, Rep ( ) function, and random number generator may all be programs that are stored in non-transitory memory of the wireless-power transmitter 102 that may be called to execution by the microcontroller 204.

The microcontroller 210 of the wireless-power receiver 108, may execute a program stored in non-transitory memory to input the unique identifier, the receiver nonce, the transmitter nonce, the helper data, and the receiver secret key into Hash( ) function and compare the resulting data with the date transmitted by the wireless-power transmitter 102 in the previous paragraph to determine whether there is a match (authentication) or no match (no authentication). If there is a match, the microcontroller 210 may execute a program stored in non-transitory memory to input the unique identifier, transmitter nonce, and receiver secret key into a Hash( ) function and transmit the resulting data to the wireless-power transmitter 102.

The microcontroller 204 of the wireless-power transmitter 102, may execute a program stored in non-transitory memory of the wireless-power transmitter 102 to input the unique identifier, the transmitter nonce, and the transmitter secret key into Hash( ) function and compare the resulting data with the data transmitted by the wireless-power receiver 109 in the previous paragraph to determine whether there is a match (authentication) or no match (no authentication).

The above-referenced programs executed by the wireless-power receiver 108 may be stored in memory 212. The above-referenced programs executed by the wireless-power transmitter 102 may be stored in memory 206.

Figure 6:
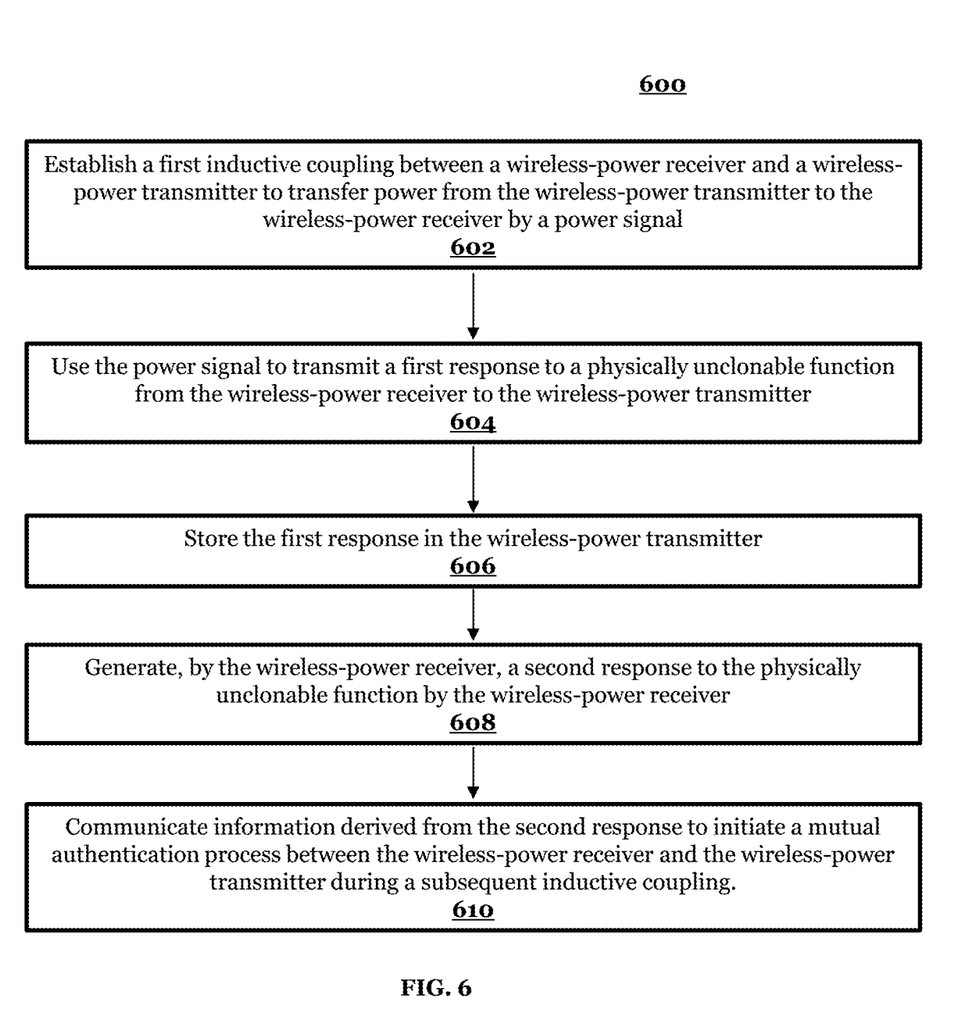
FIG. 6 depicts a method for mutual authentication in accordance with an embodiment.

FIG. 6 depicts a method for mutual authentication in accordance with an embodiment.

In various embodiments, a method 600 for mutual authentication may comprise at a step 602 establishing a first inductive coupling between a wireless-power receiver and a wireless-power transmitter to transfer power from the wireless-power transmitter to the wireless-power receiver by a power signal. In various embodiments, the method 600 may comprise at a step 604 using the power signal to transmit a first response to a physically unclonable function from the wireless-power receiver to the wireless-power transmitter. At a step 606, in various embodiments, the method 600 may comprise storing the first response in the wireless-power transmitter. At a step 608, the method 600, may comprise generating, by the wireless-power receiver, a second response to the physically unclonable function by the wireless-power receiver. And, at a step 610, the method 600 may comprise communicating information derived from the second response to initiate a mutual authentication process between the wireless-power receiver and the wireless-power transmitter during a subsequent inductive coupling.

In various embodiments, the method 600 may further comprise adjusting the second response based on one or more metrics.

In various embodiments, the method 600 may further comprise wherein a metric comprises a temperature.

In various embodiments, the method 600 may comprise wherein a metric comprises a location of the wireless-power receiver relative to the wireless-power transmitter.

In various embodiments, the method 600 may comprise, wherein a metric comprises a location of the wireless-power receiver relative to the wireless-power transmitter.

In various embodiments, the method 600 may comprise wherein a metric comprises an age of the first response.

In various embodiments, the method 600 may comprise, wherein the mutual authentication process comprises using a fuzzy extractor.

In various embodiments, the method 600 may comprise, wherein the first response comprises a multi-reference response.

In various embodiments, the method 600 may comprise, further comprising moving the wireless-power receiver to multiple positions relative to the wireless-power transmitter to collect the multi-reference response.

Example 1. A method for mutual authentication comprising: establishing a first inductive coupling between a wireless-power receiver and a wireless-power transmitter to transfer power from the wireless-power transmitter to the wireless-power receiver by a power signal; using the power signal to transmit a first response to a physically unclonable function from the wireless-power receiver to the wireless-power transmitter; storing the first response in the wireless-power transmitter; generating, by the wireless-power receiver, a second response to the physically unclonable function by the wireless-power receiver; and communicating information derived from the second response to initiate a mutual authentication process between the wireless-power receiver and the wireless-power transmitter during a subsequent inductive coupling.

Example 2. The method of Example 1, further comprising adjusting the second response based on one or more metrics.

Example 3. The method of Example 1 or Example 2, wherein a metric comprises a temperature.

Example 4. The method of Example 1 to Example 3, wherein a metric comprises a location of the wireless-power receiver relative to the wireless-power transmitter.

Example 5. The method of Example 1 to Example 4, wherein a metric comprises a location of the wireless-power receiver relative to the wireless-power transmitter.

Example 6. The method of Example 1 to Example 5, wherein a metric comprises an age of the first response.

Example 7. The method of Example 1 to Example 6, wherein the mutual authentication process comprises using a fuzzy extractor.

Example 8. The method of Example 1 to Example 7, wherein the first response comprises a multi-reference response.

Example 9. The method of Example 1 to Example 8, further comprising moving the wireless-power receiver to multiple positions relative to the wireless-power transmitter to collect the multi-reference response.

Example 10. A wireless-power receiver comprising: an inductive coil configured to receiver a power signal from a wireless-power transmitter during couplings with the wireless-power transmitter wherein the power signal induces a charging current in an analog circuit coupled with the inductive coil; a microcontroller configured to modulate the power signal to communicate a first response to a physically unclonable function to the wireless-power transmitter during a first coupling between the wireless-power transmitter and the wireless-power receiver; and wherein the microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

Example 11. The wireless-power receiver of Example 10, wherein the microcontroller modulates the power signal by varying a load of the analog circuit.

Example 12. The wireless-power receiver of Example 10 or Example 11, wherein the wireless-power transmitter communicates with the wireless-power receiver by modulating a frequency of the power signal.

Example 13. The wireless-power receiver of Example 10 to Example 12, wherein the mutual authentication process comprises a reverse fuzzy extractor authentication process.

Example 14. The wireless-power receiver of Example 10 to Example 13, wherein the first response comprises a multi-reference response.

Example 15. The wireless-power receiver of Example 10 to Example 14, further comprising a temperature sensor in communication with the microcontroller the temperature sensor being configured to measure a temperature of the wireless-power receiver and wherein the microcontroller adjusts the second response based on the temperature.

Example 16. The wireless-power receiver of Example 10 to Example 15, further comprising a location sensor in communication with the microcontroller, the location sensor being configured to measure a distance between the wireless-power receiver and the wireless-power transmitter and wherein the microcontroller adjusts the second response based on the distance between the wireless-power receiver and the wireless-power transmitter.

Example 17. A system for wireless-power transfer comprising: a wireless-power transmitter comprising: a transmitter inductive coil configured to produce a power signal; a transmitter microcontroller in communication with a transmitter analog circuit coupled with the transmitter inductive coil, the transmitter microcontroller being configured to modulate the power signal for communication; and a memory in communication with the transmitter microcontroller. The system further including a wireless-power receiver comprising: a receiver inductive coil configured to receive the power signal from the wireless-power transmitter during couplings with the wireless-power transmitter wherein the power signal induces a charging current in an analog circuit coupled with the receiver inductive coil; and a receiver microcontroller configured to modulate the power signal to communicate a first response to a physically unclonable function to the wireless-power transmitter during a first coupling between the wireless-power transmitter and the wireless-power receiver; and wherein the receiver microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

Example 18. The system of Example 17, wherein the wireless-power transmitter communicates with the wireless-power receiver by modulating a frequency of the power signal.

Example 19, the system of Example 17 or Example 18, wherein the mutual authentication process comprises a reverse fuzzy extractor authentication process.

Example 20, the system of Example 17 or Example 19, wherein the first response comprises a multi-reference response.

Example 21, the system of Example 17 or Example 20, wherein the wireless-power receiver further comprises a temperature sensor in communication with the receiver microcontroller the temperature sensor being configured to measure a temperature of the wireless-power receiver and wherein the receiver microcontroller adjusts the second response based on the temperature.

Example 22, the system of Example 17 or Example 21, wherein the wireless-power receiver further comprises a location sensor in communication with the receiver microcontroller, the location sensor being configured to measure a distance between the wireless-power receiver and the wireless-power transmitter and wherein the receiver microcontroller adjusts the second response based on the distance between the wireless-power receiver and the wireless-power transmitter.

The references used herein are provided merely for convenience and hence do not define the extent of protection or the scope of the embodiments.

References to illustrative embodiments in this description are not intended to be construed in a limiting sense. Various modifications and combinations of the illustrative embodiments, as well as other embodiments will be apparent to persons skilled in the art upon reference to the description. It is therefore intended that the appended claims encompass any such modifications or embodiments.

What is claimed is:

1. A method for mutual authentication comprising:
   establishing a first inductive coupling between a wireless-power receiver and a wireless-power transmitter to transfer power from the wireless-power transmitter to the wireless-power receiver by a power signal;
   using the power signal to transmit a first response to a physically unclonable function from the wireless-power receiver to the wireless-power transmitter;
   storing the first response in the wireless-power transmitter;
   generating, by the wireless-power receiver, a second response to the physically unclonable function by the wireless-power receiver; and
   communicating information derived from the second response to initiate a mutual authentication process between the wireless-power receiver and the wireless-power transmitter during a subsequent inductive coupling.

2. The method of claim 1, further comprising adjusting the second response based on one or more metrics.

3. The method of claim 2, wherein a metric comprises a temperature.

4. The method of claim 2, wherein a metric comprises a location of the wireless-power receiver relative to the wireless-power transmitter.

5. The method of claim 2, wherein a metric comprises a location of the wireless-power receiver relative to the wireless-power transmitter.

6. The method of claim 2, wherein a metric comprises an age of the first response.

7. The method of claim 1, wherein the mutual authentication process comprises using a fuzzy extractor.

8. The method of claim 1, wherein the first response comprises a multi-reference response.

9. The method of claim 8, further comprising moving the wireless-power receiver to multiple positions relative to the wireless-power transmitter to collect the multi-reference response.

10. A wireless-power receiver comprising:
    an inductive coil configured to receiver a power signal from a wireless-power transmitter during couplings with the wireless-power transmitter wherein the power signal induces a charging current in an analog circuit coupled with the inductive coil;
    a microcontroller configured to modulate the power signal to communicate a first response to a physically unclonable function to the wireless-power transmitter during a first coupling between the wireless-power transmitter and the wireless-power receiver; and
    wherein the microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

11. The wireless-power receiver of claim 10, wherein the microcontroller modulates the power signal by varying a load of the analog circuit.

12. The wireless-power receiver of claim 10, wherein the wireless-power transmitter communicates with the wireless-power receiver by modulating a frequency of the power signal.

13. The wireless-power receiver of claim 10, wherein the mutual authentication process comprises a reverse fuzzy extractor authentication process.

14. The wireless-power receiver of claim 10, wherein the first response comprises a multi-reference response.

15. The wireless-power receiver of claim 10, further comprising a temperature sensor in communication with the microcontroller the temperature sensor being configured to measure a temperature of the wireless-power receiver and wherein the microcontroller adjusts the second response based on the temperature.

16. The wireless-power receiver of claim 10, further comprising a location sensor in communication with the microcontroller, the location sensor being configured to measure a distance between the wireless-power receiver and the wireless-power transmitter and wherein the microcontroller adjusts the second response based on the distance between the wireless-power receiver and the wireless-power transmitter.

17. A system for wireless-power transfer comprising:
    a wireless-power transmitter comprising:
        a transmitter inductive coil configured to produce a power signal;
        a transmitter microcontroller in communication with a transmitter analog circuit coupled with the transmitter inductive coil, the transmitter microcontroller being configured to modulate the power signal for communication; and
        a memory in communication with the transmitter microcontroller;
    a wireless-power receiver comprising:
        a receiver inductive coil configured to receive the power signal from the wireless-power transmitter during couplings with the wireless-power transmitter wherein the power signal induces a charging current in an analog circuit coupled with the receiver inductive coil; and a receiver microcontroller configured to modulate the power signal to communicate a first response to a physically unclonable function to the wireless-power transmitter during a first coupling between the wireless-power transmitter and the wireless-power receiver; and wherein the receiver microcontroller is configured to generate a second response to the physical unclonable function during a second coupling between the wireless-power transmitter and the wireless-power receiver and communicate information derived from the second response to initiate a mutual authentication process between the wireless-power receiver and the wireless-power transmitter.

18. The system of claim 17, wherein the wireless-power transmitter communicates with the wireless-power receiver by modulating a frequency of the power signal.

19. The system claim 17, wherein the mutual authentication process comprises a reverse fuzzy extractor authentication process.

20. The system of claim 17, wherein the first response comprises a multi-reference response.

21. The system of claim 17, wherein the wireless-power receiver further comprises a temperature sensor in communication with the receiver microcontroller the temperature sensor being configured to measure a temperature of the wireless-power receiver and wherein the receiver microcontroller adjusts the second response based on the temperature.

22. The system of claim 17, wherein the wireless-power receiver further comprises a location sensor in communication with the receiver microcontroller, the location sensor being configured to measure a distance between the wireless-power receiver and the wireless-power transmitter and wherein the receiver microcontroller adjusts the second response based on the distance between the wireless-power receiver and the wireless-power transmitter.

\* \* \* \* \*

UNITED STATES PATENT AND TRADEMARK OFFICE
CERTIFICATE OF CORRECTION

| | |
|---|---|
| PATENT NO. | : 11,831,793 B2 |
| APPLICATION NO. | : 17/107532 |
| DATED | : November 28, 2023 |
| INVENTOR(S) | : Alessi et al. |

It is certified that error appears in the above-identified patent and that said Letters Patent is hereby corrected as shown below:

In the Claims

In Column 18, in Claim 19, Line 1, delete "system" and insert -- system of --.

Signed and Sealed this
Fifteenth Day of October, 2024

*Katherine Kelly Vidal*

Katherine Kelly Vidal
*Director of the United States Patent and Trademark Office*